(12) United States Patent
Staykoff

(10) Patent No.: US 9,225,612 B2
(45) Date of Patent: Dec. 29, 2015

(54) GENERIC MULTISERVICE NETWORK CENTRE FOR CREATING AND ORCHESTRATING NETWORK APPLICATIONS AND SERVICES

(76) Inventor: Constantin Staykoff, Sofia (BG)

( * ) Notice: Subject to any disclaimer, the term of this patent is extended or adjusted under 35 U.S.C. 154(b) by 566 days.

(21) Appl. No.: 13/254,121

(22) PCT Filed: Feb. 8, 2010

(86) PCT No.: PCT/FR2010/000087
§ 371 (c)(1),
(2), (4) Date: Nov. 1, 2011

(87) PCT Pub. No.: WO2010/100343
PCT Pub. Date: Sep. 10, 2010

(65) Prior Publication Data
US 2012/0099571 A1    Apr. 26, 2012

(30) Foreign Application Priority Data
Mar. 5, 2009  (FR) ...................................... 09 00993

(51) Int. Cl.
*H04W 40/00* (2009.01)
*H04L 12/24* (2006.01)
(Continued)

(52) U.S. Cl.
CPC ................ *H04L 41/50* (2013.01); *H04L 67/02* (2013.01); *H04L 67/04* (2013.01); *H04L 67/16* (2013.01); *H04M 3/42* (2013.01); *H04M 3/436* (2013.01); *H04M 2207/18* (2013.01)

(58) Field of Classification Search
CPC ......... H04L 41/50; H04L 67/02; H04L 67/04; H04L 67/16; H04M 3/42; H04M 3/436; H04M 2207/18
USPC ........................................................ 370/338
See application file for complete search history.

(56) References Cited

U.S. PATENT DOCUMENTS 6,523,074 B1 * 2/2003 Dianda et al. ................. 710/100
7,184,534 B2 * 2/2007 Birch et al. ............. 379/211.01
(Continued)

FOREIGN PATENT DOCUMENTS

EP    1345456 A2    12/2002

OTHER PUBLICATIONS

Kavadias, et al., "MobileIN: Harmonized services over heterogeneous Mobile, IN and WLAN infrastructure", Jun. 19, 2005, 14th 1st Mobile & Wireless Communications Summit, p. 1-6.*
(Continued)

*Primary Examiner* — Brian J Gillis
*Assistant Examiner* — Amy Ling
(74) *Attorney, Agent, or Firm* — B. Craig Killough; Barnwell Whaley Patterson & Helms

(57) ABSTRACT

The present invention relates to a digital telecommunications system for creating, integrating, grouping, managing, deploying, activating and orchestrating mobile, fixed, IP, converged and next generation services and networks. Said system is called MULTI-SERVICE NETWORK CENTER (10), and includes at least one application and service orchestration server module (15), referred to as Network Browser (15), at least one administration module (13), at least network gateway module (18), at least one integration gateway module (14) and at least one database and profiling module (19). Said system includes means to be integrated to at least one core telecommunications network and means for introducing and/or management of services of complex control into said core network and in at least one of the elements thereof. Said system further includes means for opening said core network and at least one of the core network elements to at least one service, wherein said at least one service is an own service, an operator service, a third-party service, an Internet service, or any other service. Moreover, said system includes means for opening said core network and at least one element of said core network to at least one other digital network.

20 Claims, 2 Drawing Sheets

Figure 1:
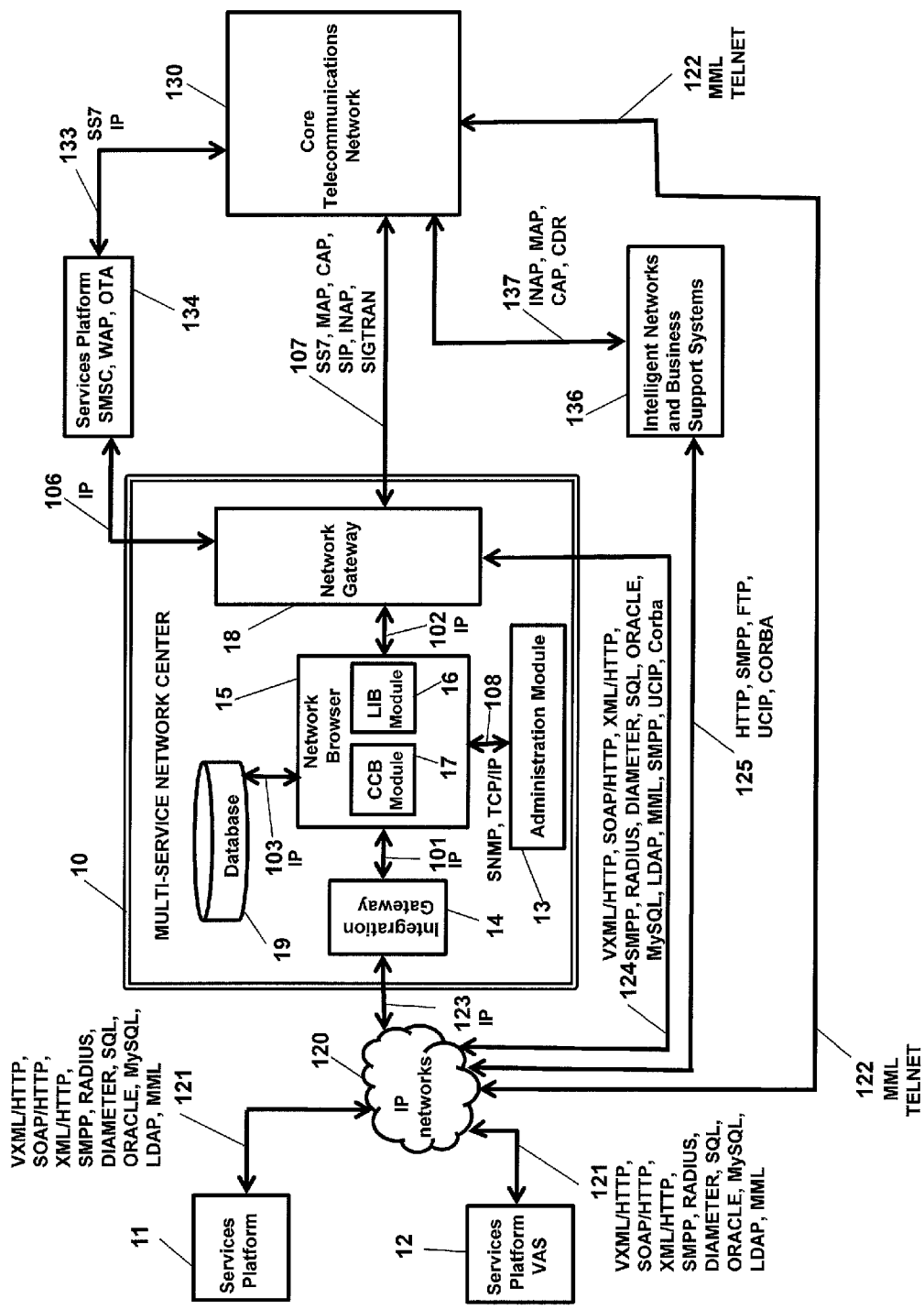

(51) Int. Cl.
  *H04M 3/42* (2006.01)
  *H04L 29/08* (2006.01)
  *H04M 3/436* (2006.01)

(56) References Cited

U.S. PATENT DOCUMENTS

| | | | |
|---|---|---|---|
| 7,499,861 B2* | 3/2009 | Danieli et al. | 704/275 |
| 7,720,049 B1* | 5/2010 | Mikhailov et al. | 370/352 |
| 2004/0044624 A1* | 3/2004 | Katou et al. | 705/40 |
| 2007/0121855 A1* | 5/2007 | Tiliks et al. | 379/142.01 |
| 2008/0146201 A1* | 6/2008 | O'Neill et al. | 455/414.1 |
| 2009/0052641 A1* | 2/2009 | Taylor et al. | 379/93.01 |
| 2010/0299590 A1* | 11/2010 | Gissler et al. | 715/239 |

OTHER PUBLICATIONS

Tombros, et al., "A Knowledge-based Service Creation and Execution Framework for Adapting Composite Wireless IP Services", 2007, IFIP International Federation for Information Processing, vol. 247, pp. 271-278.*

Anonymous, "HP Prepaid Billing", no date, hp opencall.*

Magedanz, et al., "The OpenPEEM as core for service orchestration within the Open IMS Playground at FOKUS", Jun. 15, 2002, Fraunhofer Institute FOKUS/Technical University of Berlin, Germany, p. 1-2.*

Nokia Siemens Networks, Service Delivery Framework, 2007, Nokia Siemens Networks Corporation. p. 3-13.*

Sakurai et al., "An open system architecture for operation support system at telecommunications service providers", 2003, Published in "Proceeding ISICT '03 Proceedings of the 1st international symposium on Information and communication technologies", pp. 524-529.*

Tompros et al., "Provision of unified IN functionality in the context of IMS", May 14, 2008, Telecommun Syst (2008) 37:191-201.*

Barbeau et al., "A General Architecture in Support of Interactive, Multimedia, Location-Based Mobile Applications", Nov. 2006, IEEE Communications Magazine.*

IST Mobile & Wireless Communication Summit, Jun. 19-23, 2005, Poster, Networks: Architectures & Reconfigurability.*

Kavadias, et al., MobileIN: Harmonized services over heterogeneous Mobile; IN and WLAN infrastructures.

Albatross; IS-2001-34780/FOKUS/WP3/D8; AlbatrOSS Intermediate Architecture and Specifications.

Internet Citation; Jun. 23, 2005 pp. 1-2; Retrieved from Internet; URL:http://www.aurasip.org/Proceedings/Ext/IST05/papers_M.html.

Romellini Tonelli, CCXML: The Power of Standardization, Loquendo Vocal Technology and Services, Sep. 27, 2005.

Rouillard, Web services and speech-based applications around VoiceXML, Journal of Networks, vol. 2, No. 1, Feb. 2007, Academy Publisher.

* cited by examiner

GENERIC MULTISERVICE NETWORK CENTRE FOR CREATING AND ORCHESTRATING NETWORK APPLICATIONS AND SERVICES

The present invention is a generic multiservice network center for creation and orchestration of applications and network services.

The present invention is in the domain of network application servers, specifically in the domain of the creation, integration, grouping, management, deployment, activation, and orchestration of network services (mobile, fixed, IP (Internet Protocol), convergent and next generation) and of real-time network services, including the means of orchestration of local and/or external services.

The present invention lies particularly in the area of mobile telephony and in the context of providing new features and services to users, management of call and data flow, including heterogeneous networking sessions, at the same time addressing signaling and voice calls and/or data and/or multimedia. The context of the present invention is the handling of events while simultaneously handling tasks already being processed.

This context originates from user behavior that makes use of a growing number of ever more diverse applications and services.

In general, the present invention understands the term <<user>> to mean a physical subscriber, either fixed or roaming (moving between networks), of at least one telecommunications network, or a third party, for example a provider of applications, services, content, or equipment, for example an alarm or a notification device.

The user equipment, or "terminal", is for example a mobile (or cellular) telephone, a pocket computer combining numerous functions, a multifunctional desktop, mobile, or vehicle computer, home or business platform, for example, performing security or surveillance, or any other fixed or mobile device that can communicate with at least one network.

Currently, telecom operators, or "operators," complement and diversify the services offered with such networks, with services like mobile VAS ("Mobile Value-Added Services"), performed on dedicated platforms, like IN ("Intelligent Network", concept defining functions of controlling telecommunication network equipment).

All these features lead to congestion of the network and VAS platforms. This congestion is reflected on one hand in increasing the number of VAS platforms on the periphery of the core network, leading to many difficulties in prioritization and orchestration of real-time services provided to users. On the other hand, adding additional modules within the same VAS platform makes it extremely complex and inflexible and propagates the same rigidity throughout the network.

This technical problem is independent of the network architecture, conventional or NGN ("Next Generation Network"), and specifically relates to functionality like:

Call management and control during multiservice sessions in all modes of operation (prepaid, subscription, or mixed) and in all modes (local, inter-network roaming or nomadic);

Availability of services to interact with and orchestrate various other services such as prepaid services, VPN ("Virtual Private Network"), incoming and outgoing call filtering ("Call Screening"), "Ring back tones" and many other real-time network services.

Simultaneous support for numerous other services (Internet services, for example), complementary to call control services and management of services requested by users, groups or community users, or other events.

Ability to respond to the problems involved with interacting with different applications, that is to say, to manage the convergence of applications and services, like the convergence of services based on IP (Internet Protocol) or of IT (Information Technology).

Ability to provide an SCE (Service Creation Environment) for the purposes of creation, management, and orchestration of services.

Ability to provide an ecosystem for the complete value chain, including all players like telecommunications operators, providers of mobile services and convergent services, equipment manufacturers, IT module providers, providers of OSS (Operational Support Systems) solutions, providers of BSS (Business Support Systems) solutions, system integrators, associated industries, etc.

Ability to be generic and to support future generations of telecommunication core networks, etc.

Currently, the market for mobile telecommunications is more and more competitive and segmented. To respond to user needs, telecommunication operators propose bundles of services that encompass a grouping of services, for example they may provide an allowance of three hours of talk time to mobile numbers, unlimited usage of SMS (Short Message Service) in non-peak hours, thirty MMS (Multimedia Message Service), a discount of twenty percent on international roaming, and a virtual fixed line number (conventional or VoIP (Voice over Internet Protocol) attached to the same mobile subscription.

However, to manage a complex set of offerings, it is essential to develop specific management of each stream of calls (incoming and outgoing) and of interference and prioritization of these flows. With current technology, this produces an environment heavy in implementation and operational cost. The services required for the same offers are often provided by different vendors. This translates, on one hand, into complex and therefore expensive implementations and integrations and, on the other hand, a significantly reduced interoperability between services.

Furthermore, a major additional constraint remains due to the fact that some of these services require real-time management and execution.

Thus, the management of existing services and addition of new services both prove to be complicated and often not feasible.

In this context, commercial offerings encounter major difficulties that are technical and relate time-to-market and customization.

Thus, a more flexible telecommunications core network is critical to satisfy these requirements.

The technical problem then becomes, on one hand, to conceive of a non-intrusive, open and flexible way to implement a system that is added to the telecommunications core network architecture, existing or new, and, on the other hand, to create and orchestrate various services, existing or new, while conforming to standards and being transparent to existing systems, and all this at low cost and reduced time to integrate, implement, deploy, and maintain (? Not sure what they are trying to implement, deploy, and maintain).

In order to address these needs, prior art provides various approaches which only address limited aspects of the problem or service platforms that are difficult to integrate into telecommunications networks.

One known piece of prior art is document U.S. Pat. No. 7,418,089, which relates to a telecommunications service for the control and management of telephone calls by keeping restricted and prioritized phone numbers in a Service Control Point (SCP). When call data between a subscriber's number and an external number are received, the SCP determines whether the external phone number is in the list of prioritized or restricted numbers. When the external telephone number is in the restricted list, the call is released and the call data is recorded. When the external telephone number corresponds to the prioritized list or is not in the restricted list, the call is communicated. The SCP transmits recorded call information to a management system that is accessible by the subscriber via the Internet and interactive voice response is implemented to generate a report. The service also includes means to change the restrictions and priorities.

However, this document focuses primarily on the management of identifications and acceptances and rejections of calls using specific methods. This document does not solve the problem of managing cohabitating services.

Another prior art document is U.S. Pat. No. 7,184,534, which is related to a method of connecting the call control functions of a call server to voice processing capabilities using a common server program comprising call reception in the voice server, the voice server processing call parameters and transferring the parameters to another server with a program execution module based on said call parameters. The enforcement program executing the parameters generates a script. This script is transferred from the other server to the voice server and is executed within the voice server to handle the call. The call is then transferred from the voice server to a telephony server if the voice server identifies all call control functions contained in the script while executing the script. The telephony server executes call control functions identified in the script. A shell script interpreter of type voice VXML (Voice eXtensible Markup Language, which means an application programming interface for communication with devices related to text-to-speech and telephony) or Type CCXML (Call Control eXtensible Markup Language) is present in the voice server to process the functional instructions.

However, this document deals with telephony applications using voice servers, for use in restricted applications such as enterprise telephony networks and does not address the specifics of mobile telecommunications network services (for example, signaling services specific to mobile networks or coordination between these same services).

Another prior art document is WO2007050158, which provides a system and methods for coordinating Web services (from WWW "World Wide Web" for abbreviation of the global network called "Internet") and telephony services. One method is to define an XML element (eXtended Markup Language, language for describing and analyzing data) CCXML for call control associated with an access to a Web service application. The method involves extracting a session ID from an action in a CCXML call session. The session ID is used to store and retrieve a session context in a repository context. An application of Web services is enabled by using the session ID to coordinate events and context between the telephony and web services sessions. Said method includes a management mechanism, available to the CCXML call session, to control temporary multiplexing and protocol initiation of a session for the tasks of answering a call, call transfer, call initiation, call bridge or call release.

However, this document only addresses aspects of coordination between telephone calls and web services, limited to voice calls. This document does not solve the problem of management, coordination and prioritization of services in the core mobile network (signaling, voice, data, multimedia and others services).

The present invention solves the described technical problem by using a generic, multi-service system designed for the core of the telecommunication network, and allowing for the integration, creation, deployment, and orchestration of heterogeneous services (existing or new) with an open, flexible, and non-intrusive architecture, operating in real time.

The system described in the present invention manages services and flows in telecommunications networks, next generation networks, Internet networks (or so-called "Web") and other networks. In addition, the system also provides different logic for orchestration, services, and a variety of combinations of services.

The solution supports at least one network type with standard or proprietary protocols. All supported protocol messages, whether standard or proprietary, are interpreted and processed by the system in real time.

The subject system of this invention gives the operator the ability to prepare its network so that services (including those of external providers) are integrated directly into the core network, and thus benefit from many network services already in place, such as pricing and/or changes in pricing and billing, either real time or offline. Also, the accessibility of the core is available for network integration and orchestration of "wild" or isolated Web services, such as information services, Internet messaging, and others. The telecommunications operator can perform grouping of services, opening the core of the telecommunications network to third party services.

The generic architecture presents a scalable environment (from "scalability" which is the property of resizing a system or process respectively in terms of components or phases, quality, size, resolution, bandwidth, etc.) to create, integrate, deploy and orchestrate services. Scalability is for example reflected by the ability of processing information in terms of data, applications, services and networks.

In its broadest sense, the present invention relates to a digital telecommunications system for the creation, integration, aggregation, management, deployment, activation and orchestration of network services (mobile, fixed, IP, converging, and next generation). The system of applications and services, named MULTI-SERVICE NETWORK CENTER includes:

at least one application and service orchestration server module, called Network Browser, at least one administration module, at least one network gateway module, at least one integration gateway module, and at least one database and profiling module;

means to integrate itself in a non-intrusive or intrusive manner into at least one telecommunications core network;

means for introducing and/or managing complex services into the said core network and in at least one element of said core network, means to open said core network and at least one of its elements to at least one service that is a core service, operator service, a third party service, an Internet service or another service;

means for opening said core network and at least one of its elements to at least one other digital network.

Preferably, the Network Browser contains at least one server module for call control and call orchestration, named CCB, and at least one module for service logic orchestration and integration, named LIB. Said modules CCB and/or LIB are based on at least one communications protocol and at least one interpreter of object structured languages, related to descriptors structured by objects.

In one embodiment, said CCB module is based on at least one interpreter of a CCXML language type.

In addition, said interpreter of a CCXML language type is extended by using additional communications protocols such as SCCP, TCAP, MAP, INAP, CAMEL, DIAMETER, H.323, MGCP, CORBA, or other telecommunications or information processing protocols.

In one embodiment, said LIB module is based on at least one interpreter of the VXML language type.

In addition, said interpreter of the VXML language type is extended by using additional communications protocols, where said communications protocols are not linked uniquely to traditional voice calls.

In one embodiment, said LIB and CCB modules are implemented in a single module.

Preferably, said system is connected to at least one gateway module for a telecommunications network.

Preferably, said system is connected to at least one grouping of elements from the core telecommunications network.

Furthermore, the said system is connected to at least one grouping of networks based on at least one communication protocol and at least one interface, standard or proprietary.

Also, said system is connected to at least one services module of telecommunication operators or third party and/or at least one value-added service module.

Preferably, said system is connected to at least one intelligent network and business support module.

Preferably, at least one administrative module or at least one integration gateway or at least one LIB module or at least one CCB module or at least one network gateway or at least one Network Browser module or at least one database and profiling module is self-sufficient.

In a preferred embodiment, said administration module includes at least one WEB administration system, including at least one environment for service creation, control, grouping and orchestration of service logics, at least one test environment, at least one deployment environment, at least one environment for version control management of the services, at least one control function for the MULTI-SERVICE NETWORK CENTER, and at least one function for configuring the parameters of the network gateways.

Preferably, said service creation environment is locally accessible or remotely reachable from at least one terminal by an operator and/or third parties and/or users themselves.

In one embodiment, said services are interactive or non-interactive and end-to-end multilingual.

Furthermore, said service logic for grouping and orchestration of services is independent of the languages of the services for the entire chain—end-to-end.

In one embodiment, said database and profiling module includes at least one feature defining at least one user profile, at least one feature defining at least one service profile, and at least one feature defining at least one profile of service logic.

In a preferred embodiment, the system includes at least one pricing module and/or at least one billing module, and/or at least one unit of observation and ranking.

In another preferred embodiment, the system is a system of orchestrating multiple triggers and control of at least one service on at least one type of incoming and/or outgoing calls (from network and/or users point of view).

Preferably, said system includes at least one way to perform:
   Control of calls and services;
   Orchestration of calls and services;
   Multiple and unlimited triggering;
   Parallel sessions for managing calls and services;
   State machines for calls and services;
   Management of different event sources;
   Interpretation and execution of services and service logics;
   Use of multiple timers;
   Management of services available locally or remotely or from third parties;
   Profiling of users and services.

In one embodiment, said system hosts applications and third-party services.

In another embodiment, said system is a proxy system.

In another embodiment, said system is a router.

Furthermore, said system has the ability to replace at least one core telecommunications network.

In another specific embodiment, said system is a broadcaster.

The present invention is also related to a method of processing used in said system, comprising at least:
   a step of creation of at least one service;
   a step of creation of at least one service logic;
   a step of integration of at least one service logic in the MULTI-SERVICE NETWORK CENTER and its core network environment;
   a step of orchestration of existing and/or new services, the services being own (?) or third party;
   a step of management of multi-service sessions;
   a step of testing, validation, and versioning of services;
   a step of deployment and activation of said services in the Network Browser;
   a step of activation of new services during the execution of at least one active service.

Also, said method includes at least one step of grouping and orchestration of multiple services or service features coming from various service platforms.

In one embodiment, said method is event driven.

In a second embodiment, said method is operating in client-server mode.

In a third embodiment, said method is operating in mode point-to-point.

Advantageously, said method comprises an additional step of pricing and/or changing the pricing in real time or offline.

In addition, the method comprises an additional step of billing in real time or offline.

In a particular embodiment, said method comprises a step of managing in real-time or offline said modes of pricing and billing for any type of user (with subscription, in prepaid mode, in convergent mode, in mode bundle of services, in third-party mode) of at least one telecommunications network.

Advantageously, said method comprises an additional step of real-time or offline observation and ranking of usage and user behavior.

In one particular embodiment, pricing, billing and ranking is done by the MULTI-SERVICE NETWORK CENTER and/or by specialized external platforms.

In one embodiment, said method comprises at least one step of static and/or dynamic change of switched parameters.

In another embodiment, the method comprises at least one step of grouping messages of network protocols into a single message sent to at least one particular network element.

Advantageously, said steps are performed to ensure transparency of the MULTI-SERVICE NETWORK CENTER in regards to the core network or at least one element of said core network.

In a first example of a particular embodiment, said method comprises a step of type signaling proxy, in which the network gateway acts as a proxy for some or all of the messages of the telecommunications network.

In a second particular embodiment, said method comprises a step of collaborative signaling of triangular type.

Advantageously, said method comprises at least one step of converting between any two or more different protocols.

In one embodiment, the method comprises at least one step of changing the parameters of at least one message.

In another embodiment, the method comprises at least one step of combining at least one service with at least one profile and of supporting settings of managing states and timeline.

Finally, for any embodiment, said method is conducted in real time or offline.

The main advantages of the generic system subject of the present invention can be summarized as:

The ability to integrate seamlessly into the core telecommunications network;

The ability to introduce and/or manage, in the core network and in elements of the core network, services with complex call control that are specific to the needs of the operator and for the purpose of consolidating and launching new network services offers;

The ability to open the core telecommunications network and network elements to specific services deployed locally or outside the system (operator services, third-party, Web services, or others);

The ability to integrate additional services to the core telecommunications network in a non-intrusive way;

The ability to open the core telecommunications network and elements of the core network to other digital networks;

The ability to offer at least a number of services;

The ability to create new services;

The ability to group and orchestrate at least a number of services or service features coming from various different platforms;

The ability to offer a number of existing and/or new services, simultaneously or not and in real time or offline;

The ability to support various operating mode types, event driven, client-server, point-to-point, etc.;

The ability to handle simultaneous multi-service sessions, such as call control sessions, messaging sessions, payment sessions, browsing sessions, Web-based sessions and others for the user, for a group of users and for all users;

The ability to provide, in real time or offline, management of pricing and billing for any type of user (subscription mode, prepaid mode, convergent mode, mode bundle of services, third-party mode) of at least one telecommunication network.

The ability to define at least one service logic;

The ability to orchestrate existing and/or new services;

The ability to increase the features of the operator's telecommunications network.

The ability to offer new tools for design, creation, integration, deployment and maintenance of core network services, allowing considerable reduction of costs and resources.

Figure 2:
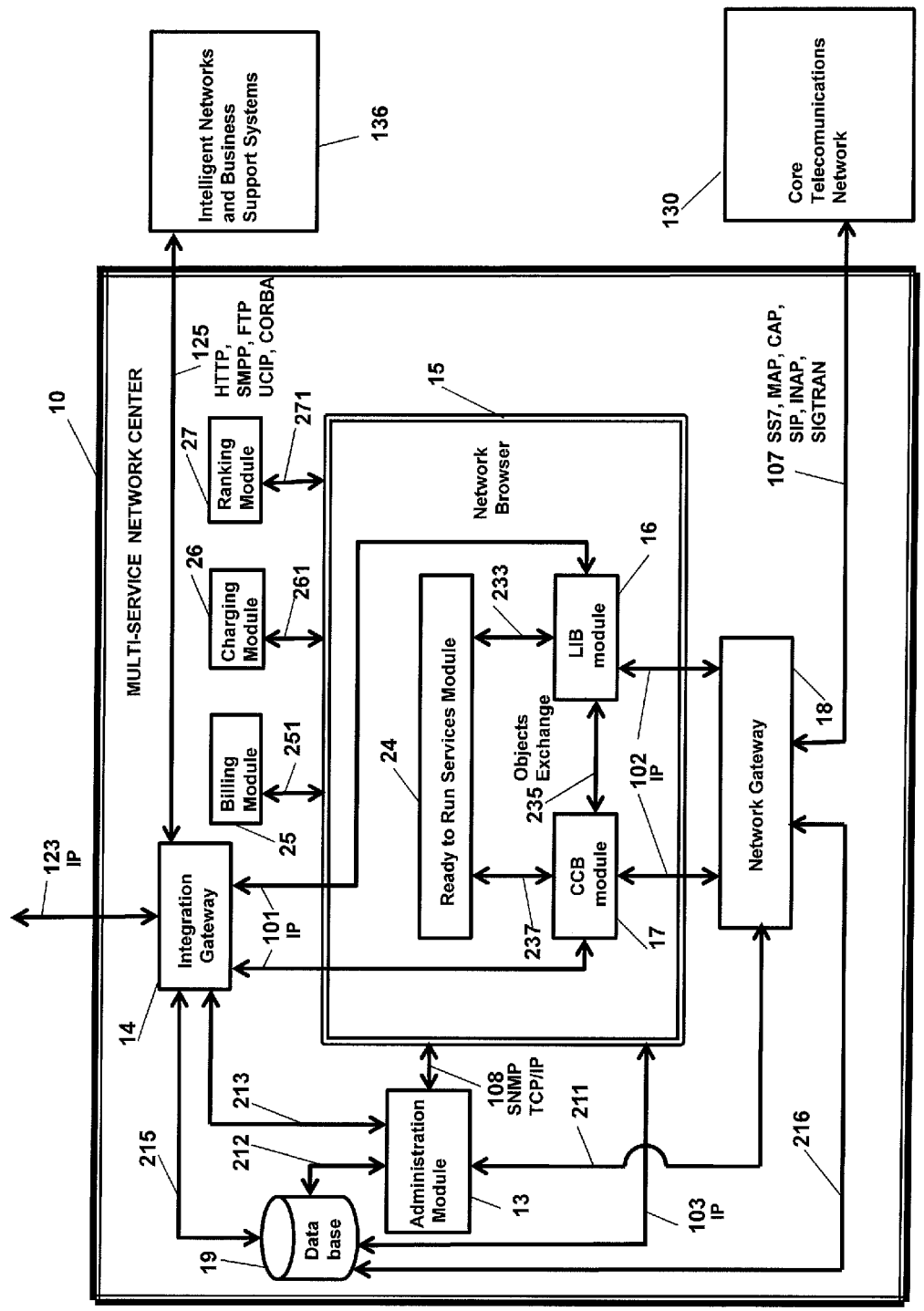

The present invention would be better understood when considering the attached reference figures showing respectively:

In FIG. 1, a general scheme of system architecture related to the current invention;

In FIG. 2, a preferred mode of embodiment of said system.

The general scheme of the present invention is illustrated in FIG. 1. An application and service orchestration platform (10), called herein "MULTI-SERVICE NETWORK CENTER" (10), is designed to offer a multitude of services, such as the following:

RB Services (reverse billing, which aims to change the billing, for example, to charge the called party and not the caller, either in local mode or when roaming). For example, the MCC service ("Mobile Collect Call") is a solution for call setup of type RB);

CS service ("Call Screening", a tool for managing the filtering of incoming and outgoing calls (for the network and/or users), ensuring call acceptance or rejection, putting on hold or period redirecting of calls to another service after a specified delay, such as voice mail or text messaging. This service includes a real-time evaluation method of the pre-call user session context);

The various real time billing services, such as a prepaid billing for Roaming MO-SMS service ("Mobile Originated Short Message Service", designating an SMS initiated by a roaming mobile terminal);

Management of USSD Callback, or call return based on USSD protocol ("Unstructured Supplementary Service Data");

MULTI-SERVICE NETWORK CENTER (10) is an open, generic multi-application and multi-service system, which provides services consistent with standard protocols used in mobile telecommunications, protocols such as SS7 "Signaling System 7", telecommunications protocol for broadband connections in circuit mode) and/or IP protocols ("Internet Protocol"), etc.

In the present invention, the term "generic system" refers to a system based on standard protocols and interpreters, existing or new, that allows the enabling of features and combination of these features, for example corresponding to those of a SSP ("Service switching point"), those of a SCP ("service Control point"), those of a SDP system ("Service Data Point") and/or a SCE ("Service Creation Environment"), all enabling the creation, management, deployment and orchestration of existing or new services and applications.

Said MULTI-SERVICE NETWORK CENTER (10) is located within the core telecommunications network, such as the core of the SS7 network, 3G/3G+ network, NGN ("Next Generation Networks"), the Internet computer network, or other digital network.

The MULTI-SERVICE NETWORK CENTER (10) consists of five main modules: at least one network gateway (18) based on at least one protocol compatible with the telecommunications network, an integration gateway (14), dedicated to information technology systems and/or networks, an administration module (13), a database and profiling system (19), and a server for applications and services orchestration (15), called "Network Browser" (15). Said Network Browser (15) comprises for example a CCB module (17) ("Call Control Browser", flexible server monitoring and orchestrating calls) and a LIB module (16) ("Logic and Integration Browser", server for service logic orchestration and integration).

In a general case, said NETWORK CENTER (10) consists of at least one Network Browser (15) having at least one CCB module (17) server for flexible control and orchestration of calls and at least one LIB module (16) server for logic orchestration and services integration, at least one network gateway module (18), at least one gateway integration module (14), at least one administration module (13), and least one database and profiling module (19).

In a first specific case, said MULTI-SERVICE NETWORK CENTER (10) includes a subset of these modules: Network Browser (15), CCB module (17), LIB module (16), network gateway (18), integration gateway (14) administration module (13) or database and profiling (19).

In a second specific case, at least one Network Browser module (15) or at least one CCB module (17) or at least one LIB module (16) or at least one network gateway module (18) or at least one integration gateway module (14) or at least one management module (13) or at least one database and profiling module (19) is self-sufficient.

In a third specific case, the CCB module (17) coincides with the LIB module (16). In the present invention, it is understood that a network gateway is a platform or a set of intermediate processes and platforms that transmits signaling and data packets on a network or on multiple networks to at least one specified destination, and allows communication with elements of heterogeneous networks. The term "gateway" is understood, therefore, to be a network gateway for any network, including at least one network interface.

The integration gateway (14) communicates with said Network Browser (15), via a link (101) and through at least one protocol interface, such as a standard IP protocol. Standard IP protocol includes all the protocols used in IP networks. The Network Browser (15) communicates with the network gateway (18) via a link (102), using protocols like IP, for example. The Network Browser (15) includes at least one connection interface able to communicate to at least one network gateway (18), and is therefore able to interpret any type of protocol embedded in said gateway, including the INAP protocol ("Intelligent Network Application Protocol", application part of the SS7 protocol related to intelligent applications), CAP ("CAMEL Application Part" protocol, "Customised applications for Mobile network Enhanced Logic" allowing a telecom operator to provide, within or outside its own network, special services to its users, such as real-time billing), MAP ("Mobile Application Protocol"), ISUP ("ISDN user part" protocol ("Integrated Services Digital Network")), SIP ("Session Initiation Protocol" a standard protocol for initiation of interactive network sessions), or others.

The administration module (13) exchanges information with the Network Browser (15) via a link (108) and using, for example, SNMP ("Simple Network Management Protocol"), TCP/IP ("Transmission Control Protocol", basic protocol for exchanging data over a network), or others. The Network Browser (15) exchanges data with the database and profiling (19) via the link (103) using protocols like IP.

Said database and profiling (19) contains information like white lists and black lists for different users, user profiles, service profiles, profiles of service logic (service logic are the rules of combining and sequencing of services) and various statistics used in the analysis and management of services. The module (19) also includes modules for static or dynamic definition of at least one user profile, at least one service profile and at least one service logic profile.

Preferably, said database and profiling (19) contains service logics and profiles of logic, routing mechanisms like key services such as MSISDN ("Mobile Station ISDN"), IMSI ("International Mobile Subscriber Identity"), the number of the called party, the number of the calling party and of others, database subsets dedicated for each user and/or service. The different profiles of the user and/or services and/or service logic are activated separately in a differentiated way or simultaneously. The differentiation of users, users being subscribers and/or groups of subscribers and/or third-party applications or services, is done in real time using static or dynamic customization.

The MULTI-SERVICE NETWORK CENTER (10) is connected through the network gateway (18) to a set of elements (130) of a "Core Network" (the center or heart of telecommunications network). This "Core Network" is, for example, a core of GSM ("Global System for Mobile"), GPRS ("General Packet Services", communications system access with packet services), UMTS ("Universal Mobile Telecommunications System"), 3G/3G+ and/or any other types of core NGN network. This set of elements (130) can be an SS7-type network that communicates with the MULTI-SERVICE NETWORK CENTER (10) via a link (107) through which communications are exchanged using a specific protocol, like MAP.

In a more general example, the MULTI-SERVICE NETWORK CENTER (10) is connected to the set of elements (130) through the network gateway (18), via a link (107) and one or more protocols like SS7, SIGTRAN (all protocols defined for transporting SS7 messages over IP) or other. For example, said link (107) consists of a CAP protocol, a protocol INAP, a SIP protocol or by a "MEDIA" protocol (transport protocol for any media such as voice, audio, images, video or other).

Said set of core network elements (130) consists of different modules (or elements), with which the network gateway (18) exchanges data. For example, these modules are of the type HLR module ("Home Location Register"), VLR module ("Visitor Location Register", database in a telecommunications system that contains the identifications of the subscribers in use), MSC module ("Mobile Switch center", center for Mobile Communications), VMSC module ("Visited Mobile Switching Center"), GMSC module ("Gateway Mobile Services Switching Center") or any other module on the networks.

The network gateway (18) is also connected to a services platform (134) via a link (106) and uses protocols like IP. The services platform (134) can be an SMSC (SMS Center), WAP gateway ("Wireless Application Protocol"), OTA gateway ("Over The Air", standard protocol for transmitting and receiving information relating to an application for mobile phones), IVR module ("Interactive Voice Response"), GPRS module (for example, MMSC module, English "Multi Media Messaging Service center"), or any other network applications module. The platform (134) is also connected to the set of core network elements (130) via a link (133) and using standard or specific protocols, for example SS7 or IP.

The MULTI-SERVICE NETWORK CENTER (10) is connected via a link (123), of type IP, for example, to a set of networks (120), for example IP networks, in which are contained various protocols connected to applications and services platforms of type module (11) telecommunications operator or third parties. Services, module (12) of value-added mobile services and/or module (136) of so-called intelligent networks and business support systems (136). Through this set of networks (120), the MULTI-SERVICE NETWORK CENTER (10) has access to platforms (12), for example VAS ("Mobile Value-Added Services") platforms. The exchanged data between the network (120) and the platform (12) is made via a link (121) using standard protocols, such as, for example VXML/HTTP ("HyperText Transfer Protocol"), SOAP/HTTP ("Simple Object Access Protocol", standard protocol for Internet services, XML/HTTP, SMPP, SQL (structured query language, designed to query or manipulate a relational database), or using proprietary protocols such as an "ORACLE"® (a relational database), "MySQL"® (a relational database), LDAP ("Lightweight Directory Access Protocol", simplified protocol for access to databases), RADIUS ("Remote authentication Dial-In User Service", client-server protocol for centralized authentication data) DIAMETER (authentication protocol and billing, an evolution of RADIUS protocol), MML ("Man-Machine Language") or other protocols.

In one implementation over the network (120), the MULTI-SERVICE NETWORK CENTER (10) has access to a platform (11), like an ASP ("Application Service Providers") platform, or MVNO ("Mobile Virtual Network Operator"), or other third parties such as banks, with which the MULTI-SERVICE NETWORK CENTER (10) exchanges information through the network (120) via a link of type (121) using the protocols listed above.

In a particular embodiment, a part of the whole network (120) is connected with one or more platforms of the entity (130) via a link (122) of type, for example, MML or TELNET ("Telecommunications Network", network protocol to execute remote commands). This is an efficient and convenient way for the MULTI-SERVICE NETWORK CENTER (10) to provide provisioning, consultation, interaction and/or alteration of information maintained in a set of core network elements (130).

In one embodiment, the MULTI-SERVICE NETWORK CENTER (10), through the link (107) and the set of elements (130), has access to the services platform (136) of type, for example, BSS ("Business Support Systems") via a link (137) using protocols like INAP, MAP, CAP, CDR ("Call Data Records") or others. The BSS module (136) could be a post-paid billing module or a prepaid billing module, or module, for example, of type IN ("Intelligent Network", concept referring to advanced functionality driving telecommunications network elements).

In a particular embodiment, the MULTI-SERVICE NETWORK CENTER (10), through the link (123) and the network (120), has access to the services platform (136) via a link (125) itself consisting of standard or proprietary, platform-specific protocols (136), such as the protocol "Ericsson" UCIP® ("User Communication Integration Protocol", a specific "Ericsson"® protocol) "Huawei" MML protocol, the applications protocol "Corba" for NSN ("Nokia Siemens Networks'®) IN, Corba protocol for "Alcatel" BSS®, Corba protocol for "LHS" BSS® or others.

In a particular embodiment, the modules (11) and/or (12) and/or (136), are integrated directly, through the network and the link (124), with the network gateway (18), said link (124) consisting of protocols as described on the link and/or (125).

The generic architecture described in this non-limiting example, which includes the modules and links illustrated in FIG. 1, shows a dynamic and interactive system for the creating, orchestrating, accessing and using of multiple applications and services by users of at least one telecommunications and/or computer network.

Also, difficult to use network features such as network services with complex call control (MCC, RB, ICS, prepaid voice, SMS, data roaming and other) and complex billing services, are made practical and easy to use thanks to the MULTI-SERVICE NETWORK CENTER (10). In addition, simultaneous and in real time services are proposed, such as the differentiation of users and/or services or their orchestration.

Advantageously additional modules of type (11), (12) and/or (136), of telecom operators or third parties are added.

In this way, the architecture shown in FIG. 1 that includes the MULTI-SERVICE NETWORK CENTER (10), network (120) and modules (11) (12) and (136) has properties suitable for scalability with regards to the ability to process information in terms of data, applications, services, networks or others.

The MULTI-SERVICE NETWORK CENTER (10) manages the applications and services according to the network resources and plans the delivery of each task based on the available bandwidth and based on requests for allocation of additional resources.

In a particular embodiment, the telecommunications operators have access to this architecture to conduct functional and load testing of external systems. The MULTISERVICE NETWORK CENTER (10) therefore offers the possibility to connect and test additional modules.

Preferably, all connections of the MULTI-SERVICE NETWORK CENTER (10) to external systems are supporting the security requirements of these systems. Exchanges are unsecured or secured with an encryption type, like SSL ("Secure Socket Layer", protocol which encrypts the data sent by a browser, or other).

The present invention is detailed below with preferred and non-limiting implementation examples.

An example of a preferred implementation of MULTI-SERVICE NETWORK CENTER (10) is shown in FIG. 2.

In a preferred implementation, the Network Browser (15) is designed from a LIB module (16) based on an interpreter of a structured language such as VXML and from a CCB module (17) based on an interpreter of a structured language such as CCXML.

In a particular implementation, the CCXML language interpreter of the CCB module (17) is extended to support any additional communications protocol (not limited to voice calls) to perform the management, coordination and hierarchization of core network services (signaling services, voice, data, multimedia, etc.). These additional communications protocols may be of types such as SCCP ("Signaling Connection Control Part"), TCAP ("Transaction Capabilities Application Part"), MAP, INAP, CAMEL, Diameter, H.323, MGCP ("Media Gateway Control Protocol"), CORBA and other telecommunications or information technology protocols. The CCB module (17) performs mainly actions (high level but also low-level) of call control and communicates via the type links (102) with the network gateway (18), using IP protocols containing representations of protocol objects of type (107). These objects are handled and processed in the CCB module (17) according to the needs of the required services.

In a particular implementation, the VoiceXML interpreter of the module LIB (16) is extended to support any additional communications protocol. Said additional communication protocols are not only related to traditional voice calls.

The LIB module (16) mainly carries out the actions of management and execution of services and communicates with the network gateway (18) via links of type (102) using IP protocol containing representations of protocol objects of type (107). These objects will be handled and processed in the LIB module (16) according to the needs of the required services.

The LIB module (16) communicates with the CCB module (17) via a link (235) allowing the exchange of objects (for example, information and/or command and/or protocol objects).

The Network Browser (15) also includes a module (24) which contains deployed, ready to run services, which can be represented using structured language such as XML. Such services can be active services, inactive services, or services in an intermediate state (pending, suspended, interrupted or other).

The CCB module (17) and the LIB module (16) communicate with this module (24) respectively via links (237) and (233), through which they recover services as objects on demand. These services are interpreted and executed by the LIB module (16) and/or the CCB module (17). Said interpreters of modules LIB (16) and CCB (17) use internal virtual memory (or "caches") for already interpreted queries, and thus all queries already interpreted are processed without navigation, meaning without new interpretation of the navigation structure already browsed.

In one variation, the LIB module (16) and the CCB module (17) are combined into one single module.

The administration module (13) of the MULTISERVICE NETWORK CENTER (10) is connected with the Network Browser (15) via the link (108), with which this administration module (13) communicates with the module (16), (17), and/or (24).

In its most general definition, the administration module (13) includes already existing network services, which can be grouped in files, for example, a service orchestration logic, a system administration of type WEB, including service creation environment ("SCE"), environment of control, of logic and of switching of services, of testing, of deployment and of version control of these services. The administration module (13) also includes control functionality of the system MULTISERVICE NETWORK CENTER (10) and functionality for configuration of parameters for the database and profiling (19), network gateways (18) and integration gateways (14).

In one variation, the MULTI-SERVICE NETWORK CENTER (10) provides management of services and content made directly by users, the users being subscribers or third parties. For example, services and content are created or customized by the user himself using a Web site or directly with a mobile terminal.

Said creation environment is available locally, remotely or from a terminal by the operator and/or by third parties and/or by users themselves.

The administration module (13) also performs the control of connections, data collection and data analysis and statistics. The administration module (13) is connected with at least one other internal module to the MULTI-SERVICE NETWORK CENTER (10), other than the Network Browser (15). The administration module (13) is for example connected with the integration gateway (14) via a link (213), with the network gateway (18) via a link (211) and with the database and profiling (19) via a link (212).

Thanks to the database and profiling (19), the MULTI-SERVICE NETWORK CENTER (10) has the ability to determine in real-time the profile of a user or a service, or group of users or a group of services, or community of users or community of services. The term "user profile" encompasses all the features tied to at least one connection and at least one session, including an IP address, a phone number, localization, time and date of the connection, duration of connection, language of the session and the navigation, location, required types of applications and services, requested content and any other requested connection property. The user profile is completed by its usage profile related to at least one service and all the parameters specific to the sessions of this service.

Thanks to the database and profiling (19), the MULTI-SERVICE NETWORK CENTER (10) has the ability to determine in real-time the profile of a service or set of services. This profile consists of information such as the reduced accessibility to free services or for a particular user group, the definition of white and black lists, or others.

Preferably, the MULTI-SERVICE NETWORK CENTER (10) contains a multilanguage setting for the entire end-to-end chain (for example, between users and service providers). Also, the service logic is independent of languages for the entire end-to-end chain.

The database and profiling (19), include features for defining at least one user profile, at least one service profile and at least one profile of service logic, and exchange information separately with the module (14) via a link (215), with the module (15) via the link (103), with the module (13) via a link (212) and with the module (18) via a link (216). In this manner, configuration information, various administration data, statistics and information on different types of profiles are completed, used and inter-changed between the modules (14), (15), (13) and (18).

In a specific implementation, the database and profiling (19) are connected only with the Network Browser (15) via the link (103), in which case the links (215), (212) and (216) are omitted. Preferably, the database and profiling (19) contain information about the characteristics of the sessions and static and dynamic statistics.

In a first preferred implementation, the Network Browser (15) contains "multi-triggering" functionality (triggering of multiple actions by type of call). These triggers could be defined in the database and profiling (19) and used by the Network Browser (15) to run and control various services related to a call type. Indeed, in the GSM network of any generation is provisioned a single trigger per type of call (for example a single trigger for outgoing voice calls in the network (MOC "mobile Originating call"), a single trigger for incoming voice calls (MTC, "Mobile Terminating call")). It is the same for other types of calls such as SMS, GPRS, etc. To overcome these limitations of the GSM network, the Network Browser (15) provides the possibility manage and orchestrate multiple triggers per call type.

In summary, the main features of the Network Browser (15) are:
Call control and services control;
Orchestrations of calls and services;
"Multi-Triggering"
Parallel sessions of call and service management;
Various call and services state machines;
Management of different event sources;
Interpretation and execution of services and service logic;
Guaranteed response time and Quality of Service ("QoS") for at least one session;
Flexible use of multiple timers;
Management of services locally, remotely and/or by third parties;
Profiling of users and services.

These features are listed for illustrative purposes but are not limited. Indeed, the Network Browser (15) is configurable to provide a multitude of additional services on demand. In addition, the Network Browser (15) operates local, remote, and/or third party services.

The open architecture of the Network Browser (15) allows integration, without modification, of extensions related to the integration gateway (14) and/or network gateway (18) modules.

In a second preferred implementation, the MULTISERVICE NETWORK CENTER (10) is configured as a "Hosting" platform, hosting applications and external or third party services. Third parties securely access the functionality of creating and activating applications and services. In the present invention the way of implementing the hosting allows telecommunications operators to develop network services operated by third parties, such as service providers. The third party access is completely secured. Telecom operators create one or several accounts for each third party by providing at least one network access and network resources. Each service provider uses the same user interface as the telecommunications operator and remotely operates its own network application with operating limits assigned by the telecommunications operator. For each service provider, a history record of activities and operations is generated. In addition, this environment for creating applications and services is provided not only to service providers but also to various users and subscribers, who can adapt and personalize their own applications, services and content in this way.

In a third preferred implementation, the MULTISERVICE NETWORK CENTER (10) is configured as a "proxy" network (digital network module connected to another network making and caching-up requests to meet the services' needs). This implementation allows implementation of prepaid roaming services using simply a CAP/INAP gateway included in the network gateway (18). Thus, the MULTI-SERVICE NETWORK CENTER (10) acts as a CAMEL proxy SPC for visited CAMEL networks and allows prepaid roamers leaving the network to initiate calls, in contrast to existing solutions requiring full CAMEL upgrade of the network.

In a fourth preferred implementation, the MULTISERVICE NETWORK CENTER (10) is configured as an active routing platform which provides mediation between different network elements and solves network issues related to routing of users, services, and applications. These problems could include the routing of a prepaid or a postpaid user to a BSS platform (136), MNP-type routing ("Mobile Number Portability") and others.

When the MULTI-SERVICE NETWORK CENTER (10) performs router functions, it has the ability to make static and/or dynamic changes of relayed parameters and to perform load sharing functions.

In a fifth preferred implementation, the MULTISERVICE NETWORK CENTER (10) is configured to perform Broadcast-type transmission of data and services to multiple users, such as broadcast advertising, alerts or useful information. In one embodiment, the Broadcast transmission is followed by a user response and an interactive exchange, like for applications such as consumer surveys.

In addition, a Broadcast service creation environment allows service providers and end users to adapt and customize their own Broadcast sessions.

Advantageously, the Broadcast environment of the MULTI-SERVICE NETWORK CENTER (10) also allows operators to launch traditional broadcast services, such as IVR, SMS, USSD, WAP, GPRS or 3G/3G+.

In one implementation of said MULTI-SERVICE NETWORK CENTER (10), the Network Browser (15) communicates via a link (261) with a charging module (26) and via a link (251) with a billing module (25). In this way the services and content requested by a single end-user are generally subject to control and billing, which can be in real-time for prepaid users or offline for users with subscription or mixed or convergent.

This example of implementation is applied to all types of users, including those with subscription, prepaid, roaming, fixed or mobile. For example, the MULTI-SERVICE NETWORK CENTER (10) operates such billing in subscription or prepaid mode using an approach known as external procedures of payment. A specific procedure for external billing is specified in the service logic when creating the service and is triggered in real time during the user session. The payment procedures are in accordance with specific payment procedures of an operator or a third party. During the session, a roaming user can be also identified so that its services are addressed appropriately during processing.

In a particular embodiment, users subscribe to any service using the MULTI-SERVICE NETWORK CENTER (10). Preferably, the MULTI-SERVICE NETWORK CENTER (10) includes a feature to modify or cancel the subscription automatically, or at the request of the user or of the service provider.

In one particular embodiment of the MULTI-SERVICE NETWORK CENTER (10), the Network Browser (15) communicates via a link (271) with an observation and ranking module (27) for which a process of usage observation and ranking of user behavior is defined. Preferably, the method of observation and ranking performs real time or deferred observation, analysis and ranking of content, services, user behavior, providers, etc. This process is used, for example, for the analysis and ranking of the solicitation of services and their subparts and for revenue generation. The parameters of observation and ranking are set during or after the service creation process in the administration module (13).

During the session, the administration module (13) generates required parameters in real-time and automatically creates an observation and/or ranking event.

Advantageously, pricing and/or changes in pricing, billing and filing is done by the MULTI-SERVICE NETWORK CENTER (10) and/or by specialized external platforms.

In one particular embodiment, the billing module (25), the pricing module (26) and the observation and ranking module (27) are integrated within the Network Browser module (15).

Preferably, the MULTI-SERVICE NETWORK CENTER (10) generates CDR format files. Once created, these files, which could contain billing information, are available to the telecommunications operator or service providers. The frequency of updating these files is could be at least once per minute. Their format is, for example, a "Structured ASN.1" ("Structured Abstract Syntax Notation One", standard way of describing a message sent or received by the network).

In one particular embodiment, the CDR file syntax is adapted by the telecom operator and some parameters are changed. The CDR file formats are generated using pre-defined parameters. The administrator has flexibility to choose between different CDR formats for each node in the service logic tree. Advantageously, a grouping of messages in a single message targeted at a particular item is made. Said network administrator in this case is an operator, service provider, or any third party to whom the administration of the service has been delegated.

Subsequently, the present invention will be clarified with the aid of illustrative and not limiting example implementations, and implemented using the architecture described in FIG. 1 and FIG. 2.

In the general case, a method of creation and activation of services (a process that can be done in real time or deferred) can include several stages, for example, a stage of creating at least one service, a stage of creating at least one service logic, a stage of integration of the service logic into the MULTI-SERVICE NETWORK CENTER (10) and the surrounding core network and third party services, a stage of orchestration of existing and/or new services, a stage of managing multi-service sessions, a stage for testing, validation, and versioning of services and a stage for deployment and activation of such services in the Network Browser (15). Subsequently, these services are open to the users.

In a first implementation example, the NETWORK CENTER (10) defines and manages the MCC service. The MCC service allows telecom operators to reverse the billing scenario, that is to say to charge the receiver and not the issuer, or both following usage cases and integration specific to each operator. To achieve this, the MCC service uses a variety of functional elements, integration gateways and networks.

With its open environment, the system takes advantage of an important flexibility. The service logic is developed and easily customized to each telecommunications operator. Simplified management of the service logic, of the integration and networks gateways of the MULTI-SERVICE NETWORK CENTER (10) allows the operator a quick deployment of MCC service.

The network gateway (18) in this case contains several gateways. Each gateway provides a variety of tasks. For example, there is an IVR-type gateway for notifying the called party of reverse billing, a CAP-type gateway for reversing the billing in real-time, a MAP gateway for real-time retrieval of information on the calling and called party (such as location, type of prepaid or post-paid billing, and others), a USSD gateway to triggering the service over USSD, and others. On the other hand, the integration gateway (14) is composed of gateways of type SMPP, HTTP, CORBA, FTP and others.

In the same context of MCC service implementation, other complex services are in place such as the ICS service ("Intelligent Call Screening"), the SMS control service from or to a mobile roaming terminal, and others.

Another preferred implementation is the method for charging and billing of a large community of subscribers (potentially consisting of hundreds of subscribers) implemented using the MULTI-SERVICE NETWORK CENTER (10). This mobile community service called CCS ("Community Charging Service", community pricing and billing service) allows telecom operators to manage sessions of communities of significant size. Unlike friends and family community-oriented services for small groups of subscribers, this service allows the management of hundreds of thousands of users, whether post-paid or prepaid or mixed mode subscribers. For example, an ICS service is implemented for outbound roamers with an automatic call filtering and call routing functions. This service includes the management of CCS blacklists and whitelists, and many other features.

This CCS service can be deployed into a core telecommunications network such as a non-intrusive routing gateway and as a Proxy for an IN platform, and is configured as proxy intervening only when negotiating CCS calls. The MULTI-SERVICE NETWORK CENTER platform (10) with its CCS service uses a processing logic appropriate to the community and routes the calls to an IN platform. In this exchange, the CCS service designates the index of appropriate pricing used by the IN. Then, the IN continues the CCS call control directly with the core network. This is only possible thanks to the ability of the MULTI-SERVICE NETWORK CENTER (10) to place itself in the core network. The advantage of this implementation is the possibility of quick enabling of flexible new core network services while leaving the critical part of continued call control to the IN and to the core network.

The technical implementation of the present invention supports a wide range of platforms and protocols, like most of MSC and IN protocols ("Ericsson"® MSC, "Huawei"® MSC, "Huawei" IN, "Ericsson"® IN, "Telen-ity" IN), CAP vI-v4, CSI (""Cisco"® SAFE implementation"), CSI+, INAP ("Intelligent Network Application Protocol", parts of the SS7 protocol related to intelligent applications), SIP ("Session Initiation Protocol", standard protocol for initiating an interactive network session), Radius (IP extensions for mobile), Diameter (IP extension for mobile), SCAP Diameter ("Service Charging Application Protocol", service protocol for billing applications), UCIP ("User Communication Integration Protocol", "Ericsson"® proprietary protocol), Parlay (standard open protocol), MAP v I-v3, AIN ("Advanced Intelligent Network"), WIN ("Wireless Intelligent Network") and many others.

Advantageously, the characteristics and technical features provided by the MULTI-SERVICE NETWORK CENTER (10), as defined, for supporting multiple services for activation of services offered by various platforms in local and roaming mode are, for example:

The transparency of the MULTI-SERVICE NETWORK CENTER (10) itself vis-a-vis functionalities or elements of the core network, for example of type SSP and SCP;

Support by the MULTI-SERVICE NETWORK CENTER (10) for various signaling mechanisms, such as a proxy-type signaling, in which the network gateway (18) (or the MULTI-SERVICE NETWORK CENTER (10) itself) acts as a proxy for some or all of the messages of the telecommunications network, or collaborative triangular signaling, in which the network gateway (18) is not an intermediary;

The ability to perform a reliable and flexible conversion between any two or more different protocols;

The ability to interpret triggers regardless of network services, such as, for example HPLMN ("Home Public Land Mobile Network") and VPLMN ("Visited Public Land Mobile Network") services;

The ability to combine and orchestrate different types of services. For example, in one variation, the MULTI-SERVICE NETWORK CENTER (10) only performs services of incoming call control, in another variation the MULTI-SERVICE NETWORK CENTER (10) only performs services of outgoing call control, and in another particular variation the MULTI-SERVICE NETWORK CENTER (10) performs services of incoming and outgoing call control;

The ability to enable new services without affecting already active services;

The ability to perform interactions by freely changing the parameters of one or more messages, grouping messages into a single message for a particular network element and multiplexing messages for other involved elements;

The ability to combine services and profiles, to support state management parameters, time, etc.;

The ability to transfer additional information through various network elements during interactions;

The ability to perform a deferred response to a previously triggered state;

The ability to manage services enabled by different elements for the same call.

The MULTI-SERVICE NETWORK CENTER (10) is, for example, built using hardware platforms such as HP ("Hewlett Packard" 8), FSC ("Fujitsu-Siemens Computers"®), IBM "International Business Machines'®) or "SUN Microsystems"®. The operating system is, for example, a "Red Hat"® or "Fedora Linux"®, or type "Sun Solaris"®. Advantageously, the MULTI-SERVICE NETWORK CENTER (10) can be built also on entry-level platforms, which results in greater accessibility and reduction in cost of implementation.

The invention claimed is:

1. A method of creating, managing and providing services within a core telecommunications network system using a digital telecommunications system having a network center platform for creation, management and provision of services within the core telecommunications network system, comprising the steps of:

creating a plurality of services as service objects in an administration module, wherein a network center platform comprises the administration module, and wherein the service objects are chosen from a group consisting of network services and core network services;

creating a service logic for combining and sequencing of service objects;

integrating the service logic into a telecommunications network browser, wherein the network center platform comprises the telecommunications network browser, and wherein the network center platform is located within a core telecommunications network;

interpreting service logic, wherein the telecommunications network browser:
  a) processes the service objects in a call control browser, wherein the telecommunications network browser comprises the call control browser, wherein the call control browser is based on a CCXML language interpreter, extended to support communications protocols;
  b) processes service objects in a logic integration browser, wherein the telecommunications network browser comprises the logic integration browser, wherein the logic integration browser is based on a VXML language interpreter, extended to support communications protocols; and
  c) exchanges service objects between the call control browser and the logic integration browser;
interpreting by the telecommunications network browser communications protocols embedded in an integration gateway platform that communicates with the telecommunications network browser or in a network gateway platform that communicates with the telecommunications network browser, wherein network center platform comprises the integration gateway platform and the network gateway platform; communicating between the telecommunications network browser and the network gateway platform by protocol objects; communicating between the network gateway platform and the core telecommunications network by protocol objects; and
implementing a plurality of services to users by provisioning, consultation, interaction, alteration and transferring of services information to a set of core telecommunications network elements.

2. The method according to claim 1, wherein the core network services are chosen from a group consisting of real time billing, call multi-triggering, incoming call control, outgoing call control services and service control point services.

3. The method according to claim 1, wherein the network services are chosen from a group consisting of mobile call control, collect call, reverse billing, intelligent call screening, data roaming, unstructured supplementary service data callback, community charging, broadcast advertising and value-added services, and routing services between different network elements and hosted services of an external third party services provider.

4. The method according to claim 1, further comprising the step of the network center platform grouping and orchestrating a plurality of services from a plurality of service platforms that communicate with the core telecommunications network and from a plurality of service platforms that are on the periphery of the core telecommunications network.

5. The method according to claim 1, wherein the method is performed while the network center platform is operating in an event mode.

6. The method according to claim 1, wherein the method performed is performed while the network center platform is operating in a client server mode.

7. The method according to claim 1, wherein the method performed is performed while the network center platform is operating in a peer-to-peer mode.

8. The method according to claim 1, further comprising the steps of the telecommunications network browser managing pricing and managing billing, wherein each of the steps of pricing of billing and managing of billing are performed in real time mode, in deferred mode, in subscription mode, in prepaid mode, in convergent mode, in mode bundle of services, or third-party mode.

9. The method according to claim 1, further comprising the step of the telecommunications network browser observing and ranking usage and user behavior.

10. The method according to claim 1, further comprising the steps of the telecommunications network browser pricing and billing services, and the telecommunications network browser ranking usage and user behavior.

11. The method according to claim 1, further comprising the step of the network center platform changing relayed parameters.

12. The method according to claim 1, further comprising the step of the network center platform grouping messages of network protocols into a single message for transmission to a particular core telecommunications network element.

13. The method according to claim 1, further comprising the step of a network gateway connected to the telecommunications network browser acts as a proxy for messages of the core telecommunications network.

14. The method according to claim 1, further comprising the step of the network center platform providing triangular collaborative signaling.

15. The method according to claim 1, further comprising the step of the network center platform converting between a first protocol and a second protocol.

16. The method according to claim 1, further comprising the step of the network center platform changing parameters of a message.

17. The method according to claim 1, further comprising the steps of the network center platform combining a service with a profile and supporting parameters of state and time management.

18. The method according to claim 1, wherein the method is performed in real time.

19. The method according to claim 1, wherein the method is performed in a deferred mode.

20. The method according to claim 1, wherein the network center platform is a core telecommunications network element.

* * * * *

UNITED STATES PATENT AND TRADEMARK OFFICE
CERTIFICATE OF CORRECTION

| | | |
|---|---|---|
| PATENT NO. | : 9,225,612 B2 | Page 1 of 1 |
| APPLICATION NO. | : 13/254121 | |
| DATED | : December 29, 2015 | |
| INVENTOR(S) | : Constantin Staykoff | |

It is certified that error appears in the above-identified patent and that said Letters Patent is hereby corrected as shown below:

Column 2, Lines 57-58

Delete the following information from the specification in the issued patent:

"? Not sure what they are trying to implement, deploy, and maintain"

Signed and Sealed this
Nineteenth Day of April, 2016

Michelle K. Lee
*Director of the United States Patent and Trademark Office*